US009114577B2

(12) United States Patent
Sperlich et al.

(10) Patent No.: US 9,114,577 B2
(45) Date of Patent: Aug. 25, 2015

(54) METHOD AND DEVICE FOR THE WET GLUING OF WOOD FIBRES

(75) Inventors: Daniel Sperlich, Pritzwalk (DE); Peter Droege, Wittenberge (DE)

(73) Assignee: KRONOTEC AG, Luzern (CH)

( * ) Notice: Subject to any disclaimer, the term of this patent is extended or adjusted under 35 U.S.C. 154(b) by 69 days.

(21) Appl. No.: 13/822,709

(22) PCT Filed: Aug. 30, 2011

(86) PCT No.: PCT/EP2011/004348
§ 371 (c)(1),
(2), (4) Date: May 21, 2013

(87) PCT Pub. No.: WO2012/034646
PCT Pub. Date: Mar. 22, 2012

(65) Prior Publication Data
US 2013/0233463 A1    Sep. 12, 2013

(30) Foreign Application Priority Data

Sep. 15, 2010  (EP) ..................................... 10009614

(51) Int. Cl.
*B27N 1/02* (2006.01)
*B27N 3/12* (2006.01)
(Continued)

(52) U.S. Cl.
CPC ................ *B29D 7/01* (2013.01); *B01F 5/0403* (2013.01); *B01F 5/0471* (2013.01);
(Continued)

(58) Field of Classification Search
CPC .... B01F 5/0403; B01F 5/0471; B01F 5/0473; B01F 13/0227; B27N 1/02; B27N 1/0263; B27N 3/04; B27N 3/12; B27N 3/18

USPC .......... 156/62.2, 62.4; 427/212, 421.1, 427.4, 427/427.6, 427.7; 118/303; 264/109, 115, 264/123
See application file for complete search history.

(56) References Cited

U.S. PATENT DOCUMENTS 2,872,337 A  *  2/1959  Heritage et al. ............... 428/499
5,827,566 A     10/1998 Epple et al.
(Continued)

FOREIGN PATENT DOCUMENTS

CA   2317513 A1  *  2/2000
DE   19740676       3/1999
(Continued)

OTHER PUBLICATIONS

Abstract and Machine Translation of DE 19740676 A1. Date of Publication Unknown.*
(Continued)

*Primary Examiner* — Michael Tolin
(74) *Attorney, Agent, or Firm* — Andrew M. Calderon; Roberts Mlotkowski Safran & Cole, P.C.

(57) ABSTRACT

A method for wet gluing of wood fibers, which have been defibrated in a refiner from wood comminuted into chips, in order that these chips, following wet gluing in a gluing zone, can be dried in a dryer, then spread, in a spreading arrangement, to form a fiber mat and pressed, in a hot press, to form a wood-material panel. The wood fibers are transported into the gluing zone, within a conveying tube, in a stream of saturated steam. In order to calm the fiber stream, the conveying tube widens at the start of the gluing zone, within which a plurality of gluing nozzles are situated, as a result of which the speed of the fiber stream is reduced before the first gluing nozzle has been reached, the fibers in the calmed fiber stream are glued with adhesive by the gluing nozzles, and then are fed to the dryer.

13 Claims, 2 Drawing Sheets

(51) Int. Cl.
    *B01F 5/04*      (2006.01)
    *B29D 7/01*      (2006.01)
    *B01F 13/02*     (2006.01)
(52) U.S. Cl.
    CPC .......... *B01F 5/0473* (2013.01); *B01F 13/0227* (2013.01); *B27N 1/02* (2013.01); *B27N 1/0263* (2013.01); *B27N 3/12* (2013.01)

(56) References Cited

U.S. PATENT DOCUMENTS

| 6,409,834 | B1 | 6/2002 | Frati |
| 6,984,266 | B2 * | 1/2006 | Buchholzer .................. 118/303 |
| 2004/0065758 | A1 | 4/2004 | Buchholzer |

FOREIGN PATENT DOCUMENTS

| DE | 19740676 | A1 | 3/1999 |
| DE | 19930800 | A1 | 2/2000 |
| DE | 202008015419 | U1 | 5/2010 |
| EP | 0728562 | A2 | 8/1996 |
| EP | 1022103 | A2 | 7/2000 |
| UA | 28105 | C2 | 10/2000 |
| UA | 87985 | C2 | 9/2009 |
| UA | 54649 | U | 11/2010 |
| WO | WO-2009116877 | A1 | 9/2009 |

OTHER PUBLICATIONS

English translation of International Preliminary Report on Patentability for Application No. PCT/EP2011/004348, 10 pages, received on Apr. 8, 2013.

Hans-Joachim Deppe et al., "MDF-Mitteldichte Faserplatten", DRW-Verlag, ISBN3-87181-329-X, 1996, 4 pages. Publication Month Unknown.

UA Decision on Grant for related UA Application No. 201303125, filed Aug. 30, 2011, 5 pages. Date of Publication Unknown.

* cited by examiner

METHOD AND DEVICE FOR THE WET GLUING OF WOOD FIBRES

FIELD OF THE INVENTION

Method for wet gluing wood fibres, which have previously been defibred in a refiner from wood broken down into chips, in order that, following the wet gluing in a gluing zone, these can be dried in a dryer, then scattered in a scattering apparatus to form a fibre cake and pressed in a hot press to form a wood material board of desired thickness, the wood fibres being transported into the gluing zone within a conveyor pipe in a stream of saturated steam.

DISCUSSION OF BACKGROUND INFORMATION

The method for wet gluing is also known as the "blow line" gluing method. In this method, the adhesive is sprayed into the conveyor pipe or blow pipe (blow line), within which the transport of the fibres from the refiner to the dryer takes place. Wet gluing is described in detail on pages 81 to 84 of "Deppe/Ernst, MDF—Mitteldichte Faserplatten" DRW-Verlag, ISBN 3-87181-329-X. The principle consists of spraying the adhesive (glue) into a stream of fibres, which moves at a speed of 150 to 500 m/s. In the device for wet gluing previously disclosed in DE 20 2008 015 419 U1, the speed of the fibres is further increased by a reduction in the cross section of the blow pipe at the injection point. The glue nozzles are arranged perpendicularly to the fibre transport direction or at an acute angle to the blow line. Also previously disclosed are arrangements in which a plurality of gluing nozzles are used, which are arranged in the form of a ring in the gluing zone.

Urea formaldehyde resins (UF) are used primarily as adhesives. As an alternative, these resins can also be reinforced with melamine and/or phenol (MUF, MUPF), and methylene diphenyl diisocyanates (MDI) are also designated as adhesives for wood material boards intended for special applications.

In the case of a blow line with a constant cross section, the adhesive must be dispensed in a relatively short section of the line, as a result of which it is not possible for a homogeneous application of glue to occur in the stream of fibres, which can result in a shading effect. Because of the nature of the process, no additional vaporization energy can be applied through a propellant, which on the one hand results in an unfavourable distribution of the adhesives on the individual fibre and on the other hand leads to an uncontrollable droplet size. This ultimately results in a susceptibility to clogging at the point of discharge through large openings and, as a consequence, the possibility of the admission of fibres against the direction of flow of the adhesive.

If the cross section in the blow line is made smaller, the droplet size will in fact be reduced through the ability to use a further medium in conjunction with the atomization, as described in WO 2009/116877 for example. However, the more compact stream of fibres intensifies the shading effect after the reduction in the cross section, which can be penetrated only with difficulty and inadequately by the adhesive stream. As a result of an increase in the speed, the time spent by the fibres in the gluing zone is shortened, and it may then become necessary to increase the quantity of adhesive in order to achieve adequate gluing of the individual fibres. In this process, the refiner is also required to overcome a greater counter pressure (additional bottleneck in the gluing zone), as a consequence of which the maximum throughput volume of the plant as a whole is reduced. The effectiveness of the propellants is reduced by the higher counter pressure in the gluing zone and the correspondingly low difference in pressure between the adhesive that is forced through the nozzles by the propellant and the pressure in the stream of fibres.

On grounds of cost alone, an effort is made to save glue. In addition, there is a risk of (excess injected) glue that is not able to combine with individual fibres becoming deposited on the walls of the blow line and causing these to become clogged in time.

Previously disclosed in DE 199 30 800 A1, in conjunction with the dry application of glue to fibres, is the reduction of the transport speed of the fibre mixture by an increase in the flow cross section of the tubular dryer and the resulting generation of a turbulent flow, of which the turbulence is increased by the injection of additional air when the glue is injected.

In order to ensure a fine wetting in conjunction with the dry application of glue, previously disclosed in EP 0 728 562 A2 is the arrangement of the nozzles in a region of the conveyor pipe, which region exhibits a diffuser-like enlargement of its cross section.

SUMMARY OF THE INVENTION

On the basis of the problems described above, it is proposed to improve the method for wet gluing wood fibres so that better gluing of the wet wood fibres and also, where appropriate, an associated adhesive saving can be achieved.

A generic method for calming the fibre stream, which offers itself as a solution to the problem, is for the conveyor pipe to widen at the start of the gluing zone, within which a plurality of gluing nozzles are present, by which means the speed of the fibre stream is reduced before reaching the first gluing nozzle, the fibres in the calmed fibre stream being glued with adhesive by means of the gluing nozzles and then fed to the dryer.

The use of the propellant is made more effective and the consumption of adhesive is reduced by the presence of a lower pressure in the blow line in the gluing section and a greater difference in pressure between the pressure of the injected adhesive and the pressure in the blow line resulting therefrom. Due to the reduction in the speed within the gluing zone, the fibre stream spends a longer time in the region of the nozzles, as a result of which the fibres are wetted more homogeneously with glue. The shading effect is also reduced as a result of the fibre stream no longer being so compact.

The pipe cross section preferably widens by up to 30% at the start of the gluing zone.

At the end of the gluing zone it is advantageous to reduce the cross section of the conveyor pipe further behind the last gluing nozzle, by which means the speed is increased again and the glued stream of fibres is fed more rapidly to the dryer.

The glue is preferably fed to the gluing nozzles at ambient temperature and particularly preferably under an increased pressure.

A device for wet gluing for gluing wood fibres transported in a stream of saturated steam in the method according to one of the preceding claims, having a conveyor pipe in which a plurality of gluing nozzles are arranged one after the other in a gluing zone as viewed in the flow direction, is characterized in that the cross section of the pipe widens by up to 30% before the first gluing nozzle.

BRIEF DESCRIPTION OF THE DRAWINGS

The pipe cross section is preferably reduced again behind the last gluing nozzle of the conveyor pipe.

An illustrative embodiment of the invention is described below in more detail with the help of a drawing. In the drawing.

DETAILED DESCRIPTION OF THE PRESENT INVENTION

Figure 1:
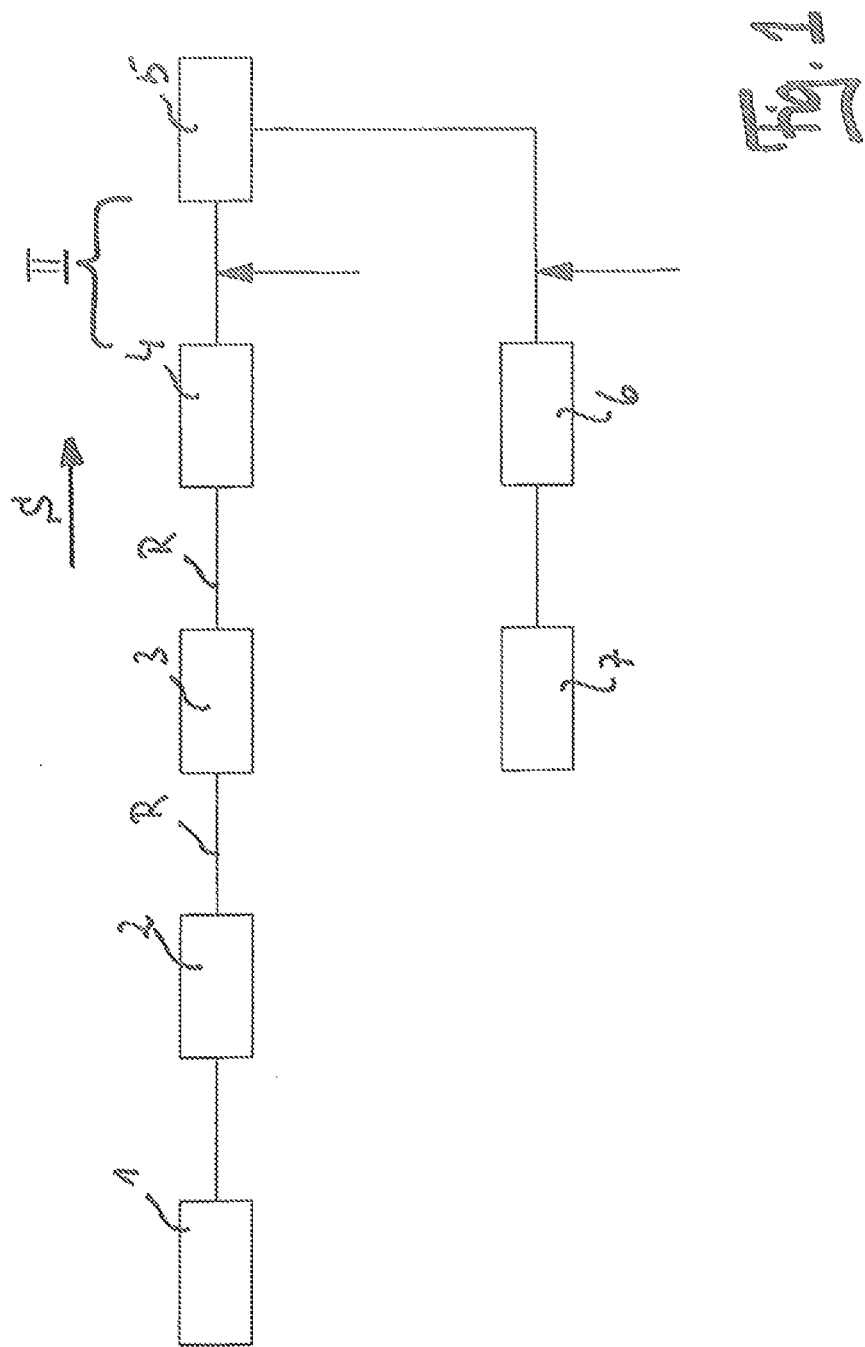
FIG. 1—depicts the process sequence in principle with reference to a flow diagram, FIG. 2—depicts the section designated with II in FIG. 1.
Figure 2:
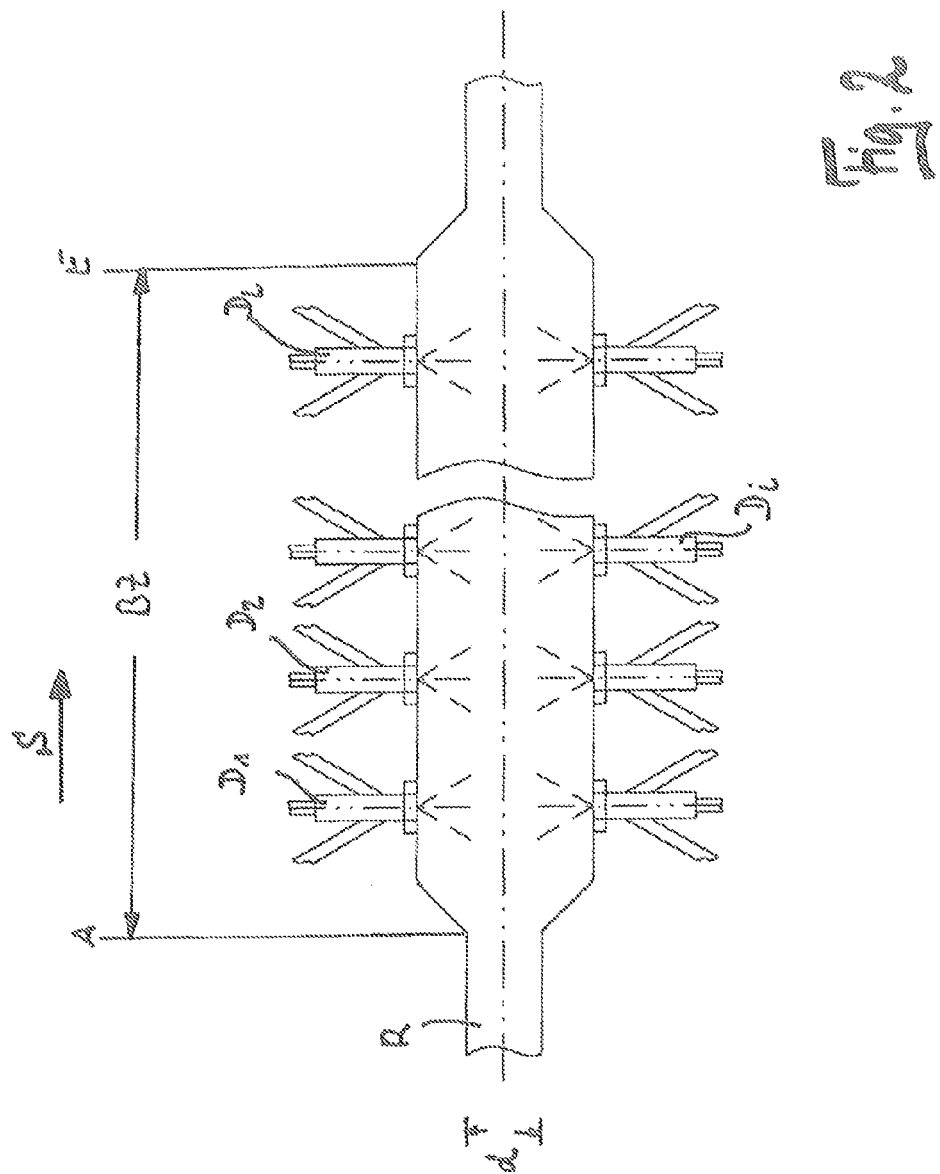

At the point designated with 1, round timber or the like is supplied to start with and is processed in the comminution apparatus 2 into wood chips, which are digested in the digester 3 and are then broken down into fibres in the refiner 4. The wood fibres that have been broken down in the refiner 4 are then transported via the conveyor pipe R into a gluing zone BZ, in which a plurality of gluing nozzles $D_1, D_2, \ldots D_L$ are arranged in the form of a ring around the pipe (blow line). At the start A of the gluing zone BZ, the pipe cross section d—viewed in the flow direction S—widens by up to 30% before the first gluing nozzle D1• The speed of the stream of fibres is reduced in this way, and the time spent in the gluing zone BZ is increased. At the end E of the gluing zone BZ, viewed in the flow direction S behind the last gluing nozzle DL, the widened pipe cross section is reduced again and the stream of wood fibres is then fed to the dryer 5, where the fibres are separated from the steam and dried. After the dryer 5, the dried wood fibres are fed into a scattering apparatus 6, where they are scattered to form a fibre cake. The fibre cake is then fed into a hot press 7, in which it is pressed under high pressure and high temperature to form a wood material board of a desired thickness. At the point identified with an arrow in FIG. 1, the dried fibres can be glued once again, using methods that are customary in dry gluing (see, DE 199 30 800 A1).

The invention claimed is:

1. A method for wet gluing wood fibres, comprising:
reducing a speed of a stream of the wood fibres prior to reaching a gluing zone, to calm the wood fibres;
gluing the calmed wood fibres with a plurality of gluing nozzles during the reduced stream speed; and
feeding the glued wood fibres to a dryer for drying.

2. The method according to claim 1, further comprising speeding up the stream of the wood fibres after the gluing in order to reach the dryer in a shorter time period than at the reduced stream speed.

3. The method according to claim 2, wherein the gluing is performed at ambient temperature and under an increased pressure.

4. The method according to claim 2, wherein the wood fibres travel in a pipe having a first cross section prior to the gluing zone which is smaller than a second cross section within the gluing zone which reduces the stream speed.

5. The method according to claim 4, wherein the pipe has another cross section after the gluing zone which is smaller than the second cross section in order to increase the stream speed to the dryer.

6. The method according to claim 5, further comprising separating and drying the wood fibres.

7. The method according to claim 6, further comprising scattering the wood fibres to form a fibre cake and feeding the fibre cake into a hot press to form a wood material board.

8. The method according to claim 7, further comprising:
processing wood timber into wood chips;
digesting the wood chips in a digester;
breaking digested wood chips into the wood fibres; and
transporting the wood fibres to the gluing zone in which the plurality of gluing nozzles are arranged in a ring around a pipe.

9. A method to form a wood material board, which have been defibered in a refiner from wood broken down into chips, comprising:
wet gluing wood fibres in a gluing zone (BZ),
drying the wood fibres in a dryer,
scattering the wet glued wood fibres in a scattering apparatus to form a fibre cake,
pressing the fibre cake in a hot press to form the wood material board of desired thickness, wherein:
the wood fibres being are transported into the gluing zone (BZ) within a conveyor pipe (R) in a stream of saturated steam,
in order to calm a fibre stream of the wood fibres, the conveyor pipe (R) widens at a start (A) of the gluing zone (BZ), within which a plurality of gluing nozzles (D1, D2, . . . Db . . . DL) are present, by which means the such that a speed of the fibre stream is reduced before reaching a first gluing nozzle D1,
the fibres in the calmed fibre stream are glued with adhesive by means of the gluing nozzles (D1, D2, . . . Di, . . . DL), and
the glued fibres are then fed to the dryer.

10. The method according to claim 9, wherein a cross section of the pipe widens by up to 30% at the start (A) of the gluing zone.

11. The method according to claim 1, wherein the cross section of the conveyor pipe (R) is reduced at the end (E) of the gluing zone behind the last gluing nozzle (DL), by which means the speed of the fibre stream is then increased.

12. The method according to claim 9, wherein the glue is fed to the gluing nozzles (D1, D2, . . . Db . . . DL) at ambient temperature.

13. The method according to claim 9, wherein the glue is injected into the fibre stream via the nozzles (D~, D2, . . . Di, . . . DL) at a positive pressure.

* * * * *

UNITED STATES PATENT AND TRADEMARK OFFICE
CERTIFICATE OF CORRECTION

| | | |
|---|---|---|
| PATENT NO. | : 9,114,577 B2 | Page 1 of 1 |
| APPLICATION NO. | : 13/822709 | |
| DATED | : August 25, 2015 | |
| INVENTOR(S) | : Daniel Sperlich et al. | |

It is certified that error appears in the above-identified patent and that said Letters Patent is hereby corrected as shown below:

In The Claims

In claim 9, at column 4, lines 14 and 15, delete:

"by which means the"

Signed and Sealed this
Twenty-second Day of March, 2016

Michelle K. Lee
*Director of the United States Patent and Trademark Office*